United States Patent [19]

Shyu et al.

[11] Patent Number: 4,893,506

[45] Date of Patent: Jan. 16, 1990

[54] METHOD FOR ESTIMATING RAINFALL AND A SENSING DEVICE THEREFOR

[75] Inventors: Jia Ming Shyu; Kuang Pu Wen; Joseph Huang, all of Hsin Chu Hsien, Taiwan

[73] Assignee: Industrial Technology Research Institute, Hsin Chu Hsien, Taiwan

[21] Appl. No.: 218,845

[22] Filed: Jul. 14, 1988

[51] Int. Cl.$^4$ ............................................. G01W 1/14
[52] U.S. Cl. ...................................... 73/171; 364/420
[58] Field of Search .................... 73/171; 340/602; 364/420

[56] References Cited

U.S. PATENT DOCUMENTS

| | | | |
|---|---|---|---|
| 1,236,381 | 8/1917 | Rogers | 73/171 |
| 3,575,641 | 4/1971 | Long | 340/602 X |
| 4,305,280 | 12/1981 | Vonnegut et al. | 73/171 |

FOREIGN PATENT DOCUMENTS 65281  4/1984  Japan ..................................... 73/171

Primary Examiner—Charles A. Ruehl
Attorney, Agent, or Firm—Cushman, Darby & Cushman

[57] ABSTRACT

An apparatus and method for estimating rainfall. A rainfall sensing device is used to generate rain signal Vo; when it is raining (Vo=1), a number of consecutive sampled rain signals are picked up within a given period of time. The conditions (shower, heavy rain, light rain or no rain) of rainfall are estimated by comparing the sampled rain signals to predetermined raining index N1 and no-rain index N2. The rainfall sensing device comprises a Wheatstone bridge circuit and a differential amplifier. The two adjacent branches of the Wheatstone bridge circuit are provided with a thermal resistor as a rain-sensor and a thermal resistor as a temperature compensating element respectively.

8 Claims, 3 Drawing Sheets

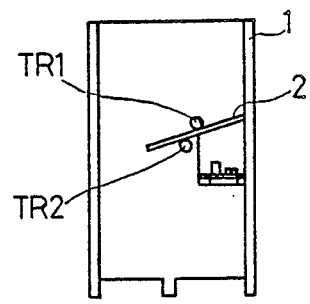
F I G.3

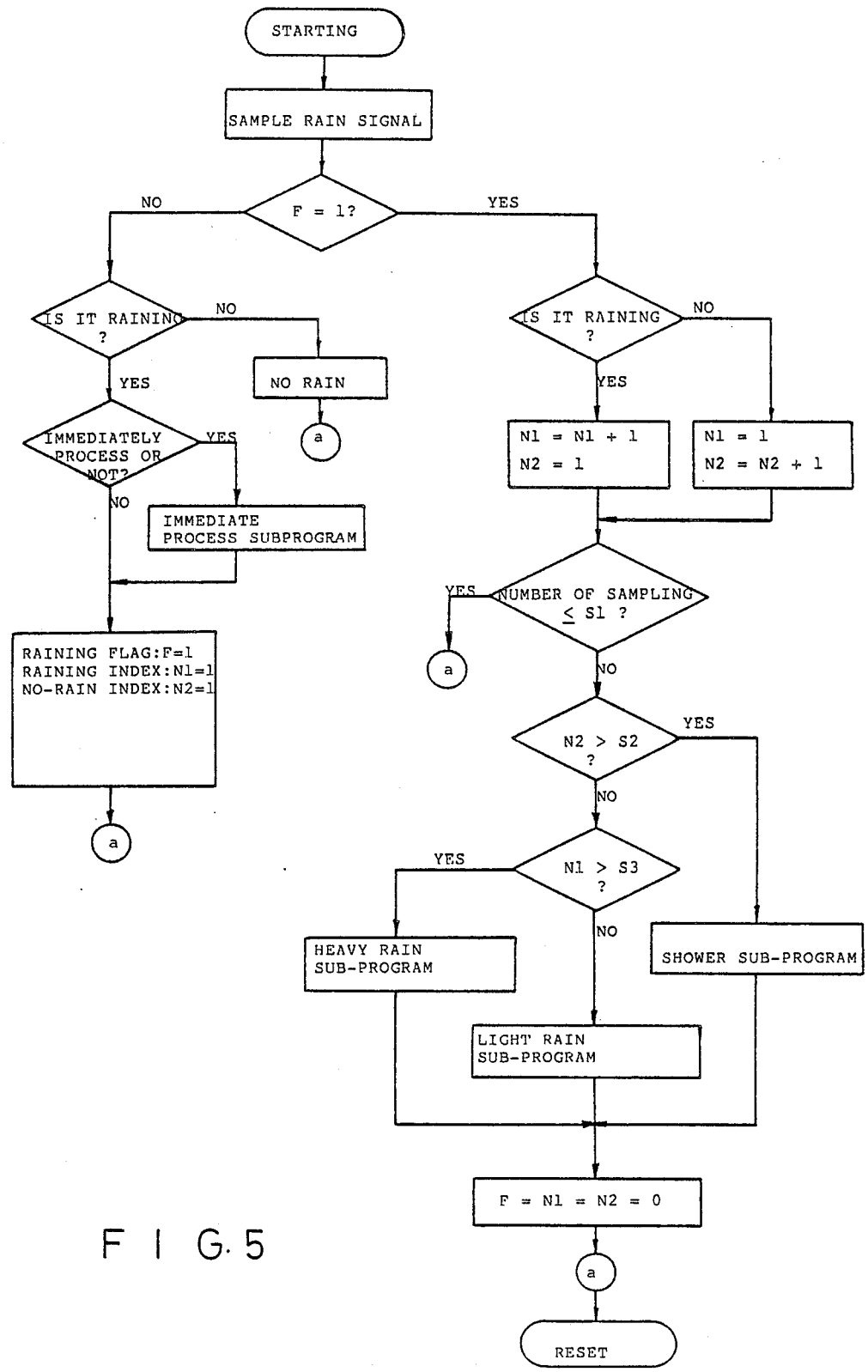
F I G. 5

METHOD FOR ESTIMATING RAINFALL AND A SENSING DEVICE THEREFOR

BACKGROUND OF THE INVENTION

The present invention relates to a method for estimating rainfall condition (such as heavy rain, shower, light rain, and no rain).

Generally, a rain sensing device is used to sense the presence of rain, presumably to prevent the articles outdoors (such as clothes or grains being dried with sunshine) from getting wet. The theory of existing rain sensing devices is based upon the change of insulation between two metal electrode plates when the device is wet; the circuits of such prior art devices are illustrated in FIGS. 1a and 1b.

A rain sensing device as shown in FIGS. 1a and 1b has two states of output, i.e., indicating whether or not it is raining. When the metal electrodes are wet, the insulation between them will be reduced and used to indicate a raining signal. A disadvantage of this prior art device, however, is that it cannot indicate that raining has stopped because the sensor will still be wet; further, such a device is also unable to sense the volume of rainfall. Although the computer technology has been well developed today, the computer is still unable to provide rainfall information by using the existing sensing device. Therefore, the inventors have developed a method and a sensing device to estimate various conditions, such as light rain, shower, heavy rain or no-rain.

SUMMARY OF THE INVENTION

In view of the above problem, the present invention has been developed to provide an apparatus and method for estimating rainfall conditions, such as heavy rain, shower, light rain, or no-rain. By means of a sensing device, rainfall conditions can be sensed, for example, in four different states to provide correct rainfall information, thus facilitating operation of various automatic machines.

During the sensing of a rainfall, the device generates a series of output signals through sequential sampling. The signal is classified as index N1 or N2 for raining or no rain, respectively.

BRIEF DESCRIPTION OF THE DRAWINGS

FIG. 3 is a sectional view of the wind shield of the rainfall sensing device according to the present invention.

FIG. 5 illustrates a flow chart of the rainfall information estimating program according to the present invention.

DETAILED DESCRIPTION OF THE PREFERRED EMBODIMENT

Figure 2:
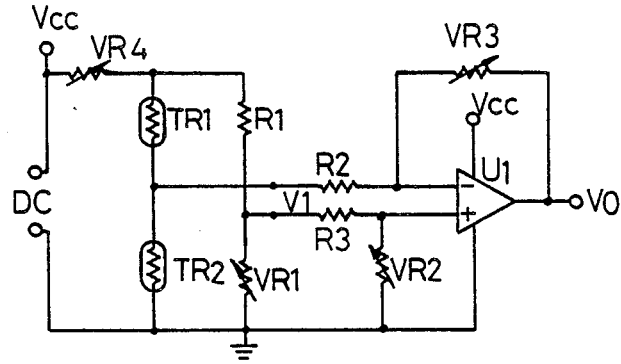
FIG. 2 illustrates a circuit of the rainfall sensing device according to the present invention.

FIG. 2 illustrates a circuit of the rainfall sensing device according to the present invention, which comprises a Wheatstone bridge circuit and an operational amplifier U1 forming a differential amplifier. On branch of the Wheatstone bridge circuit is connected with thermal resistor TR1 to sense rainfall, while the adjacent branch of TR1 is connected with thermal resistor TR2, which is used as a temperature compensating resistor. In order to prevent erroneous readings caused by wind, the device is furnished with wind shield 1 for housing thermal resistors TR1 and TR2, as illustrated in FIG. 3. Inside wind shield 1, rain shield 2 is installed to partition thermal resistors TR1 and TR2; thermal resistor TR1 is mounted above rain shield 2, while thermal resistor TR2 is mounted underneath rain shield 2. The other two branches of the Wheatstone Bridge circuit in FIG. 2 are connected to resistor R1 and variable resistor VR1, respectively. The D.C. power supply of the present invention may be a battery, a storage battery, a power source controlled by a computer, or some other D.C. power supply; however, when using a different power supply variable resistor VR4 must be adjusted so that resistors TR1 and TR2 adapt to a suitable temperature.

Thermal resistors TR1 and TR2 are operated at a temperature higher than the room temperature for two purposes: first, when rain is falling on thermal resistor TR1 the raindrop may otherwise reduce the temperature of TR1 and thus vary its resistance value; the resistance value of thermal resistor TR2, however, remains unchanged, and therefore the Wheatstone bridge circuit loses its balanced state, so that V1 is no longer "0", and [to cause the]differential amplifier has an output signal Vo. Second, heating thermal resistors TR1 and TR2 causes a raindrop falling on thermal resistor TR1 to heat and to vaporize, so that resistor TR1 is ready for sensing the next rainfall. Thus, when rain falls on thermal resistor TR1, the raindrop will be heated and vaporized; if there is no rain to fall on resistor TR1 continuously, the Wheatstone bridge circuit will restore to its balanced state as thermal resistor TR1 regains its original temperature, and V1 will be at "0", and simultaneously the differential amplifier will have no output signal (Vo=0); thus, it is possible to estimate rainfall information by determining whether the differential amplifier has an output signal Vo. The output signal Vo of the differential amplifier may be either a digital signal or an analog signal, obtained by adjusting the gain of the differential amplifier. The adjusting methods for the gain of the differential amplifier are as follows: (1) in order to obtain a digital signal output, adjust the gain of the differential amplifier (i.e., adjust variable resistors VR2 and VR3) so that the output voltage V1 of the Wheatstone ridge circuit is positioned in the saturation area of operational amplifier U1 upon raining, i.e., Vo=Vcc, the logic output being "1", and when there is no rain, the logic output is "0"; (2) in order to obtain an analog signal output, adjust the gain of the differential amplifier (i.e., adjust variable resistors VR2 and VR3) so that the output voltage V1 of the Wheatstone bridge circuit is positioned in the linear area of operational amplifier U1 upon raining: the resulting output signal Vo of the differential amplifier [is corresponding] thus corresponds to the extent of rainfall. The output Vo is to be read into a computer via A/D converter and a P/A (parallel input adapter). In a computer program determining raining conditions, a critical value can be defined such that when Vo is higher tan the critical value, the logic will be "1" (indicating raining), and when Vo is not higher than the critical value, the logic will be "0" (indicating no rain); the computer can thus be provided with the information to determine whether it is raining.

The the rainfall sensing device of the present invention is utilized to generate a rain signal (i.e. Vo signal). When it is raining (Vo =1), the rain signals will be picked up as samples within a given period of time. The rainfall condition (shower, heavy rain, or light rain) is then determined by an estimating method on the basis of raining index N1 and no-rain index N2. The definitions of the terms and symbols used in [the estimating method]determining the rainfall condition are described as follows:

(1) N1: Raining index.
(2) N2: No-rain index
(3) S1: A critical value set in the computer program to indicate the times of the sampled rain signal.
(4) S2: A critical value set in the computer program, which is the minimum value among consecutive no-rain signal times, and which is obtained, through empirical method, according to the sampling times of S1 during showers.
(5) S3: A critical value set in the computer program, which is the minimum value among consecutive raining signals, and which is obtained, through empirical method, according to the sampling times of S1 during heavy rains.
(6) F: A flag which is equal to "1" when a raining signal is sensed, and is equal to "0" when a no-rain signal is sensed.
(7) Heavy rain: A continuous rainfall, which renders the device inoperable.
(8) Shower: A period of rain which lasts only a given period of time.
(9) Light rain: A period of intermittent rain which lasts longer than a shower but with less rainfall.
(10) No rain: There is no rain. When there is a raining signal, N1=N1+1; N2=1. When there is a no-rain signal, N2=N2+1; N1=1.

Figure 1:
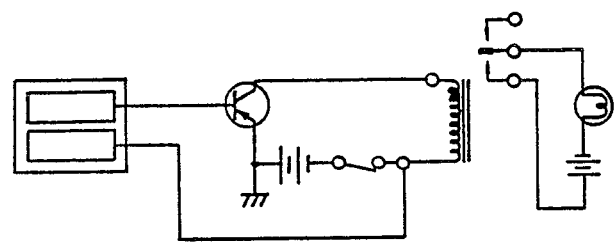
FIGS. 1a and 1b illustrate two conventional rain-sensing devices.
Figure 1:
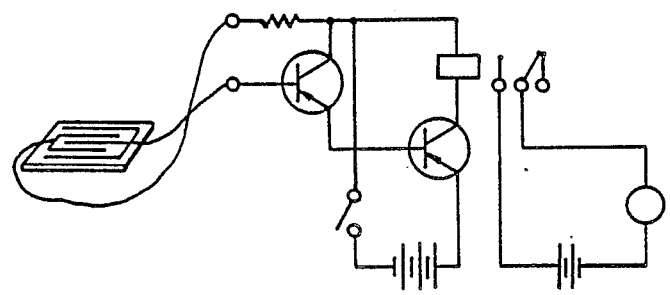
Figure 4:
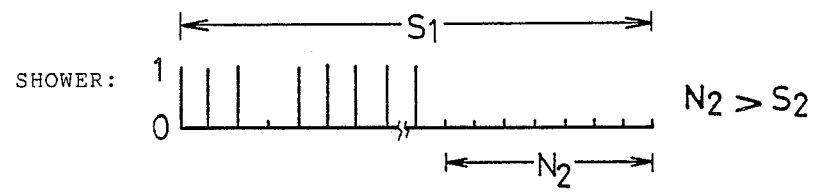
FIG. 4 illustrates a rain information estimating method according to the present invention.
Figure 4:
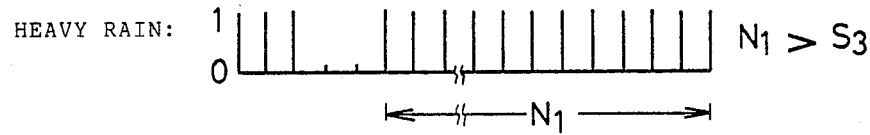
Figure 4:
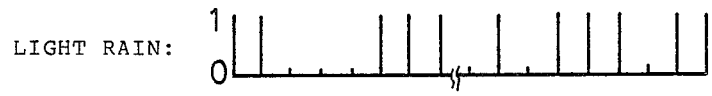

Referring to FIG. 4, three sub-views show various longitudinal coordinates, which represent the values of Vo (i.e., "1'8 stands for raining; "0" stands for no rain). The latitudinal coordinates in FIG. 4 represents the times of various rainfalls in S1 (the fixed times of rain-signal sampling).

FIG. 5 illustrates a flow chart prepared according to the aforesaid estimating method so as to let the computer controller periodically perform the rainfall information estimating program. In the event the sampled rain signal has no "raining" signal, the rainfall information would indicate "No rain"; the process of the flow chart will therefore return to its starting step, ready for the next time sampling.

When the sampled rain signal indicates that it is raining, the computer will immediately determine whether a processing action should be executed (such as sending out an alarm, or lighting up a pilot light, etc.); thereafter, a parameter is set, such as F=N1=N2=1.

When raining is sensed, a number of consecutive sampled rain signals S1 will be collected. Referring to the sub-views of FIG. 4, if:

(a) the no rain index N2 is higher than the shower critical value S2 (i.e., N2>S2), it indicates that there are N2 time of no rain, and it may be determined as showers;

(b) the raining index N1 is higher than the heavy-rain critical value S3 (i.e., N1 >S3), it indicates that there are N1 times of raining, and it may be determined as heavy rain;

(c)

the raining index has an intermittent condition, and the no rain index is not higher than the shower critical value S2, it may be determined as light rain.

The method for estimating rainfall and a sensing device therefore according to the present invention can adequately provide various rainfall information for the benefit of weather-sensitive activities, such as drying clothes or grains, which must be conducted under fine weather conditions (no rain). The present invention also benefits activites using, for example, an automatic lawn-mower or harvesting machine, which may be operated in no-rain or light rain condition, or may also be reset after shower. Finally, the rainfall information obtained by the present invention benefits automatic water-supply systems relying on rainfall information to supply (or to irrigate) water.

We claim:

1. A method for estimating rainfall, comprising the steps of:
    sensing a presence or absence of a rain drop;
    generating a rain signal in response to said sensing a rain drop, said rain signal having a rain-present state when the presence of the rain drop is sensed and a rain-absent state when the absence of a rain drop is sensed;
    sampling said rain signal in succession to generate a sequence of rain signal samples; and
    determining a rain state by comparing said samples with a predetermined minimum value, wherein said sequence of samples defines a raining signal time and a no-rain signal time, each being compared with said predetermined value to determine said rain state.

2. A method as recited in claim 1, wherein said rain state is selected from one of the following states:
    no rain, said no rain state being selected when said sequence consists of rain-absent states;
    shower, said shower state being selected when said sequence comprises a rain-present state and said no-rain signal time is greater than said predetermined minimum value, said predetermined minimum value being a shower critical value;
    light rain, said light rain state being selected when said no-rain signal time is less than said shower critical value and said raining signal time is less than a heavy-rain critical value; or
    heavy rain, said heavy rain state being selected when said raining signal is greater than said heavy-rain critical value.

3. An apparatus for estimating rainfall comprising:
    means for sensing a presence or absence of a rain drop and generating a rain signal in response thereto, said rain signal having a rain-present state in the presence of said rain drop and a rain-absent state in the absence of a rain drop, said sensing means comprising:
    first sensing means for sensing said rain drop and providing a first sensing signal indicative thereof,
    second sending means for sensing an ambient temperature and providing a second sensing signal indicative thereof, and
    comparator means for comparing said first and second sensing signals to a reference voltage, said comparator means generating said rain signal;
    sampling means for sampling said rain signal to generate a sequence of samples of said rain signal; and calculating means for determining a rain state based on said samples, said samples being compared to a predetermined minimum value.

4. An apparatus as recited in claim 3, further comprising a wind shield for protecting said sensing means from a wind, thereby stabilizing said sensing means.

5. An apparatus as recited in claim 3, wherein said first sensing means comprises a first thermal resistor, said second sensing means comprises a second thermal resistor, said first and second thermal resistors being part of a Wheatstone bridge circuit, said comparator means comprising an operational amplifier connected to said Wheatstone bridge circuit.

6. An apparatus as recited in claim 5, wherein said first and second thermal resistors operate at a temperature above a room temperature, said rain drop being vaporized when contacting said first thermal resistor.

7. An apparatus for estimating rainfall comprising:
means for sensing a presence or absence of a rain drop and generating a rain signal in response thereto, said rain signal having a rain-present state in the presence of said rain drop and a rain-absent state in the absence of a rain drop;
sampling means for sampling said rain signal to generate a sequence of samples of said rain signal; and
calculating means for determining a rain state based on said samples, said samples being compared to a predetermined minimum value, said sequence of samples comprising a raining signal time and a no-rain signal time, said raining signal time and no-rain signal time being compared with said predetermined value to determine said rain state.

8. An apparatus as recited in claim 7, wherein said rain state is selected from one of the following states:
no rain, said no rain state being selected when said sequence consists of rain-absent states;
shower, said shower state being selected when said sequence comprises a rain-present state and said no-rain signal time is greater than said predetermined minimum value, said predetermined minimum value being a shower critical value;
light rain, said light rain state being selected when said no-rain signal time is less than said shower critical value and said raining signal time is less than a heavy-rain critical value; or
heavy rain, said heavy rain state being selected from said raining signal is greater than said heavy-rain critical value.

* * * * *